US008560369B2

(12) United States Patent
Messer (10) Patent No.: US 8,560,369 B2
(45) Date of Patent: Oct. 15, 2013

(54) SYSTEMS AND METHODS FOR TECHNICAL SUPPORT BASED ON A FLOCK STRUCTURE

(75) Inventor: Martin Messer, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 991 days.

(21) Appl. No.: 11/933,532

(22) Filed: Nov. 1, 2007

(65) Prior Publication Data

US 2009/0119147 A1    May 7, 2009

(51) Int. Cl.
*G06Q 10/00*    (2012.01)

(52) U.S. Cl.
USPC ..................... 705/7.14; 705/7.22; 705/304

(58) Field of Classification Search
USPC ....................... 705/7.11–7.42, 304
See application file for complete search history.

(56) References Cited

U.S. PATENT DOCUMENTS

| | | |
|---|---|---|
| 3,882,868 A | 5/1975 | Tundermann |
| 4,062,131 A | 12/1977 | Hsiung |
| 4,185,402 A | 1/1980 | Digate |
| 4,186,499 A | 2/1980 | Massok, Jr. et al. |
| 4,228,549 A | 10/1980 | Rispoli |
| 4,279,213 A | 7/1981 | Urahama et al. |
| 4,387,516 A | 6/1983 | Laux |
| 4,517,308 A | 5/1985 | Ehlenz et al. |
| 4,864,740 A | 9/1989 | Oakley |
| 5,287,505 A | 2/1994 | Calvert et al. |
| 5,465,508 A | 11/1995 | Bourdeau |
| 5,467,391 A | 11/1995 | Donaghue et al. |
| 5,894,682 A | 4/1999 | Broz |
| 5,903,641 A | 5/1999 | Tonisson |
| 6,044,497 A | 4/2000 | Richardson |
| 6,134,530 A | 10/2000 | Bunting et al. |
| 6,177,932 B1 | 1/2001 | Galdes et al. |
| 6,247,182 B1 | 6/2001 | Tasbas |
| 6,260,048 B1 | 7/2001 | Carpenter et al. |
| 6,324,282 B1 | 11/2001 | McIllwaine et al. |
| 6,336,227 B1 | 1/2002 | Liput et al. |
| 6,481,120 B1 | 11/2002 | Xia et al. |
| 6,578,291 B2 | 6/2003 | Hirsch et al. |
| 6,639,982 B1 | 10/2003 | Stuart et al. |
| 6,724,884 B2 | 4/2004 | Jensen et al. |
| 6,763,333 B2 | 7/2004 | Jones et al. |
| 6,766,539 B1 | 7/2004 | Huber |
| 6,807,269 B1 | 10/2004 | Atwood et al. |
| 6,868,370 B1 | 3/2005 | Burbridge et al. |
| 6,871,322 B2 | 3/2005 | Gusler et al. |
| 6,937,715 B2 | 8/2005 | Delaney |
| 6,946,196 B2 | 9/2005 | Foss |
| 6,978,006 B1 | 12/2005 | Polcyn |

(Continued)

OTHER PUBLICATIONS

"Problem Management and Escalation Process" (2006) Symantec Corporation.*

(Continued)

*Primary Examiner* — Lynda Jasmin
*Assistant Examiner* — Sujay Koneru
(74) *Attorney, Agent, or Firm* — Lowenstein Sandler LLP (57) ABSTRACT

An embodiment relates generally to a method of providing technical support. The method includes providing for a plurality of technical groups. Each technical group specializes in a technical area and is comprised of a plurality of senior and junior members. The method also includes receiving a technical issue and routing the technical issue to a selected technical group based on the technical area of the technical issue. The method further includes generating a solution to the technical issue from the selected technical group.

24 Claims, 7 Drawing Sheets

(56) References Cited

U.S. PATENT DOCUMENTS

| | | | |
|---|---|---|---|
| 7,023,979 | B1 | 4/2006 | Wu et al. |
| 7,047,671 | B2 | 5/2006 | Steed et al. |
| 7,225,139 | B1* | 5/2007 | Tidwell et al. ............... 705/7.15 |
| 7,266,734 | B2 | 9/2007 | Chavez et al. |
| 7,330,822 | B1 | 2/2008 | Robson et al. |
| 7,353,230 | B2* | 4/2008 | Hamilton et al. ............ 705/7.29 |
| 7,610,213 | B2 | 10/2009 | Jones et al. |
| 7,634,598 | B2* | 12/2009 | Kim et al. ....................... 710/62 |
| 7,730,005 | B2 | 6/2010 | Gilliam et al. |
| 7,734,783 | B1 | 6/2010 | Bourke et al. |
| 7,783,029 | B2 | 8/2010 | Whitecotten et al. |
| 7,783,755 | B2* | 8/2010 | Goss et al. .................... 709/225 |
| 2001/0001143 | A1 | 5/2001 | Jones et al. |
| 2001/0049890 | A1 | 12/2001 | Hirsch et al. |
| 2002/0032597 | A1 | 3/2002 | Chanos |
| 2002/0066209 | A1 | 6/2002 | Steed et al. |
| 2002/0123983 | A1* | 9/2002 | Riley et al. ....................... 707/1 |
| 2003/0007628 | A1* | 1/2003 | Vortman et al. .......... 379/266.07 |
| 2003/0083941 | A1* | 5/2003 | Moran et al. ..................... 705/14 |
| 2003/0172133 | A1 | 9/2003 | Smith et al. |
| 2004/0210469 | A1 | 10/2004 | Jones et al. |
| 2004/0249786 | A1 | 12/2004 | Dabney et al. |
| 2005/0010461 | A1 | 1/2005 | Manos |
| 2005/0039192 | A1* | 2/2005 | Chavez et al. ................ 719/318 |
| 2005/0047579 | A1* | 3/2005 | Salame .................... 379/265.09 |
| 2005/0060217 | A1* | 3/2005 | Douglas et al. .................... 705/9 |
| 2005/0131750 | A1 | 6/2005 | Kogan |
| 2006/0039547 | A1 | 2/2006 | Klein et al. |
| 2006/0153356 | A1 | 7/2006 | Sisselman et al. |
| 2007/0116185 | A1 | 5/2007 | Savoor et al. |
| 2007/0174390 | A1* | 7/2007 | Silvain et al. ................ 709/204 |
| 2007/0265873 | A1* | 11/2007 | Sheth et al. ........................ 705/1 |
| 2007/0288800 | A1 | 12/2007 | Chavez et al. |
| 2008/0021755 | A1* | 1/2008 | Jones et al. ........................ 705/8 |
| 2008/0034060 | A1* | 2/2008 | Fisher, Jr. ..................... 709/218 |
| 2008/0056233 | A1* | 3/2008 | Ijidakinro et al. ............ 370/352 |
| 2008/0091983 | A1 | 4/2008 | Boss et al. |
| 2008/0155564 | A1 | 6/2008 | Shcherbina et al. |
| 2008/0162688 | A1 | 7/2008 | Reumann et al. |
| 2008/0195694 | A1 | 8/2008 | Alaniz et al. |
| 2008/0209279 | A1* | 8/2008 | Van Riel et al. ................. 714/45 |
| 2008/0225872 | A1* | 9/2008 | Collins et al. ................. 370/412 |
| 2008/0228692 | A1 | 9/2008 | Wannemacher et al. |
| 2008/0263077 | A1 | 10/2008 | Boston |
| 2008/0288267 | A1* | 11/2008 | Asher et al. ....................... 705/1 |
| 2009/0012838 | A1* | 1/2009 | DeJong et al. .................. 705/10 |
| 2009/0018890 | A1 | 1/2009 | Werth et al. |
| 2009/0043669 | A1 | 2/2009 | Hibbets et al. |
| 2009/0049133 | A1* | 2/2009 | Odom et al. .................. 709/206 |
| 2009/0063175 | A1* | 3/2009 | Hibbets et al. .................... 705/1 |
| 2009/0094091 | A1 | 4/2009 | Thieret et al. |
| 2009/0132307 | A1 | 5/2009 | Messer |
| 2009/0138510 | A1 | 5/2009 | Childress et al. |

OTHER PUBLICATIONS

"WebCrossing Announces New Support Crossing Solution; Customer and Techinical Support Oriented Online Community Solution for Cost-Effective Support and Customer Feedback" (2001) Business Editiors and High Tech Writers. Business Wire.*

TrtackWise—User's Guide Sparta Systems, Inc., 2000.

Choosing and Issue and Change Management Tool—White Paper Merant, 1999, Retrieved from Archive.org.

Merant PVCS Tracking—Issue and Change Management Solution—Reviewers Guide Merant, Aug. 2000, Retrieved from Archive.org.

Yee, Ka-Ping, Roundup—An Issue Tracking System for Knowledge Workers 2000.

Duioit, Allen H. et al., Using an issue-based model in a team-based software engineering course IEEE, 1996.

Unipress.com—Footprints Unipress, Nov. 2000, Retrieved from Archive.org Oct. 2005.

Serrano, Nicolas et al., Buzgilla, ITracker and Other Bug Trackers IEEE Software, Mar./Apr. 2005.

USPTO; Office Action for U.S. Appl. No. 11/393,613, mailed Apr. 22, 2009.

USPTO; Notice of Allowance for U.S. Appl. No. 11/393,613, mailed Dec. 28, 2009.

* cited by examiner

SYSTEMS AND METHODS FOR TECHNICAL SUPPORT BASED ON A FLOCK STRUCTURE

FIELD

This invention relates generally to technical support, more particularly, to systems and methods for technical support based on a flock structure.

DESCRIPTION OF THE RELATED ART

Computers and software have become critical tools in today's information based society. Computers and software have provided tools to users to greatly increase work efficiencies. However, with the advantages provided by computers and software come occasional technical problems associated with the computers and software applications. A typical solution to a computer and/or software technical problem is to contact technical support of the company that provided the computer and/or software.

Technical support departments are typically organized in a funnel structure. More particularly, the funnel structure is based on having a large number of generalists to intake the reported problem and attempt to resolve the reported problem. Above the generalists, there is a smaller number technical experts. If the first level of support, the generalists, cannot resolve the problem, the generalist can then escalate the reported problem to the technical experts for resolution. When the problem is resolved by the technical expert, the resolution is forwarded to the generalist to report back to the report user.

However, as products evolve and become increasing complex, it is becoming apparent that the generalists or first level of support are becoming less equipped to handle the reported issues as the products demand an increasing knowledge of specialized areas. In effect, the technical support issues are demanding the generalist to have more breadth of knowledge as well an increasing depth of knowledge. Ultimately, this can lead to a situation of hiring entry level associates (at entry level prices) will become problematic since the wide range of expertise required in a single person. Accordingly, there is a need in the art for a way to provide resolution of technical issue without demanding for specialized skills and a wide breadth of knowledge for entry level technical support personnel.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to methods and systems for a novel technical support model that provides enhanced service and visibility. More particularly, a flock structure can be implemented to support the products of an entity. The flock structure can be organized around product or component skill specialization, i.e., a specialized group of senior and junior technical support staff focused on a specific areas. A logical router can be configured to direct an incoming technical issue to an appropriate technical group to resolve the technical issue either via web site or via telephone. The technical issue is assigned to a flock member, who takes ownership of the issue. The technical issue can also be logged into an issue tracker module. The issue tracker module can then be configured to issue notification to the rest of the flock members to provide attention to the technical issue. Outside members of the flock can subscribe to a mailing list provided by the issue tracker module to become fully informed about the issue as well to participate in the issue resolution.

Figure 1:
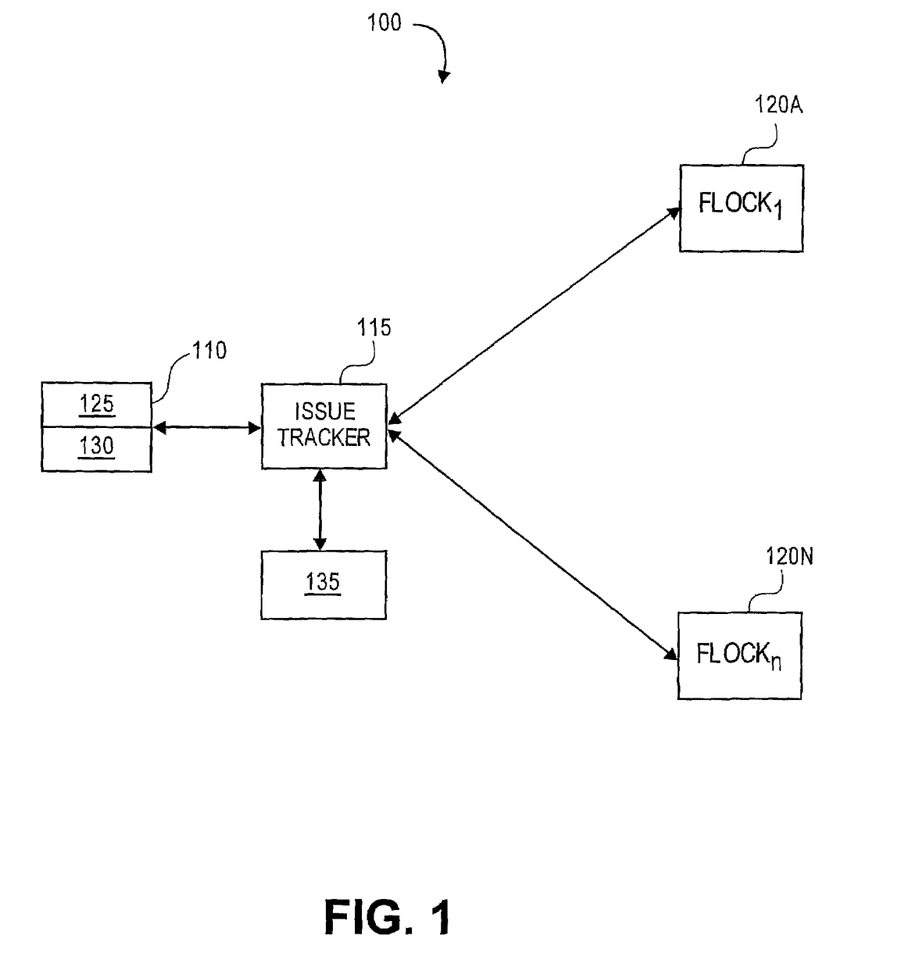
FIG. 1 depicts an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a logical router 110, a case management system 115, and flocks 120. The logical router 110 can be configured to direct requests for technical assistance to the appropriate flock 120. The logical router 110 can comprise of two components: a telephone router module 125 and a web router module 130.

The telephone router module 125 module can be configured to direct telephone calls to a selected flock 120 based on a telephone routing algorithm based on probability. More particularly, the telephone routing algorithm monitors the received telephone calls. The flock 120 that receives the highest percentage of calls can be deemed the highest probability. The flock 120 that receives the second highest percentage of calls can be deemed the second highest probability and so forth to the flock that receives the lowest percentage of calls can be deemed the lowest probability. Accordingly, a telephone call for technical assistance is then routed to the flock 120 with the highest probability. A first available member in the selected flock 120 can then process the telephone call, i.e., accept the telephone ticket as a technical issue or route the telephone call to the appropriate flock 120.

The web router module 130 can be configured to route users using a web service and/or website to technical support. More particularly, a user can access a web service and/or website for technical assistance. The web service can display a graphical user interface such as a web page that queries the user for the type of assistance and the associated product and/or service. The web service can then forward the received information to the web router module 130. Subsequently, the web router module 130 can then direct the request for assistance to the appropriate flock 120.

The case management system (or issue tracker) 115 can be configured to manage the technical issue from start to resolution. More particularly, the case management system 115 can log a request for technical assistance as a support ticket. The support ticket can then be assigned to a support person such as an engineer, specialist, etc. The case management system 115 can then receive status updates from the engineer/specialist as to the resolution of the technical issue. Subsequently, the case management system 115 can close the support ticket when the technical issue has been resolved and the solution posted to the support ticket by the assigned engineer. Case management systems are generally well known systems such as Numara Help Desk™, Sinergia Help Desk™, Issue Tracker, etc.

The case management system 115 can also comprise a flock module 135. The flock module 135 can be configured to provide the infrastructure to implement the flock model of support. More particularly, the flock module 135 can be configure to maintain and manage the flocks 120A-N. Each flock 120 can comprise of junior and senior members of a technical staff where each member may not be geographically co-located in the same location. A junior member can be engineer/specialist from entry-level to about five years of experience. A senior member can also be an engineer/specialist with over five years of experience. The differentiation between junior and senior members can be a user-defined parameter. Each flock 120 can also be organized around a particular skill, product, or service. For example, in some implementations of the flock model, one flock can be assigned to an application stack, a second flock can be assigned to virtualization, a third flock can be assigned to a file system, etc. In other embodiments, the composition of the flock can be user determined.

Accordingly, the flock module 135 can be configured to maintain a mailing list that includes the junior and senior members for each flock 120. As a ticket is assigned to a member of a flock 120, the flock module 135 can be configured to transmit a notification message that notifies the flock 120 of a new technical issue associated with the new ticket. Any member of a flock 120 can post a message to the ticket, which is then forwarded to the rest of the members of the flock 120 by the flock module 135. The flock module 135 can also forward a copy of the post to the ticket to the reporting user of the associated technical issue.

The flock module 135 can also be configured to send notification messages to interested third parties. Examples of interested third parties can be a product development team, an engineering team, a quality assurance team, etc.

For any interested third parties, the flock module 135 can be configured to maintain a subscription link for each open support ticket. More specifically, when the case management system 115 instantiates a new support ticket, the flock module 135 can create a subscription link associated with the support ticket. Accordingly, an interested party can activate the subscription link to receive status updates, posts, or other activity associated with the support ticket as well as participate in the resolution of the support ticket. In some embodiments, an instant messaging or short messaging system can supplement the subscription link.

Figure 2:
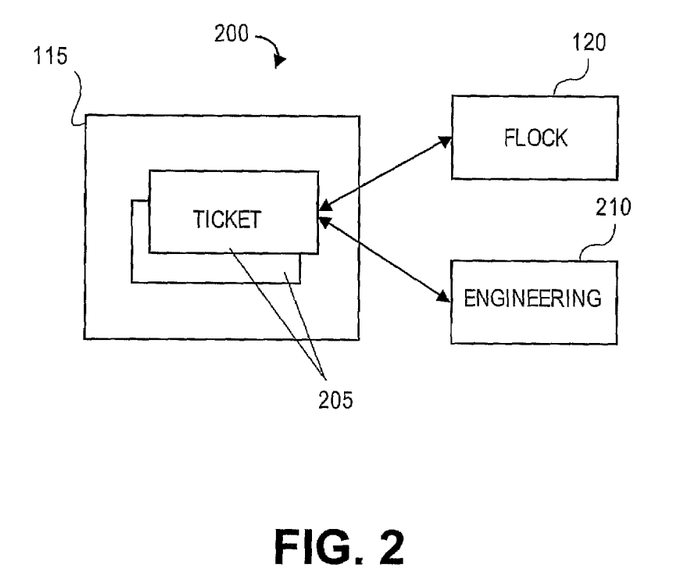
FIG. 2 illustrates an exemplary flock structure in accordance with another embodiment.

FIG. 2 depicts a diagram 200 of a flock associated with multiple tickets in accordance with another embodiment. As shown in FIG. 2, the support tickets 205 that have been associated with a selected flock 120 are routed to the selected flock 120 and are maintained in the case management system 115. The flock module 135 can be configured to forward any activity to each member of the selected flock 120 as well as to any interested members of the engineering team 210. The flock module 135 can use a mailing list as a mechanism to forward status messages, comments, etc, as well as to receive the same from the members of the selected flock 120.

Figure 3:
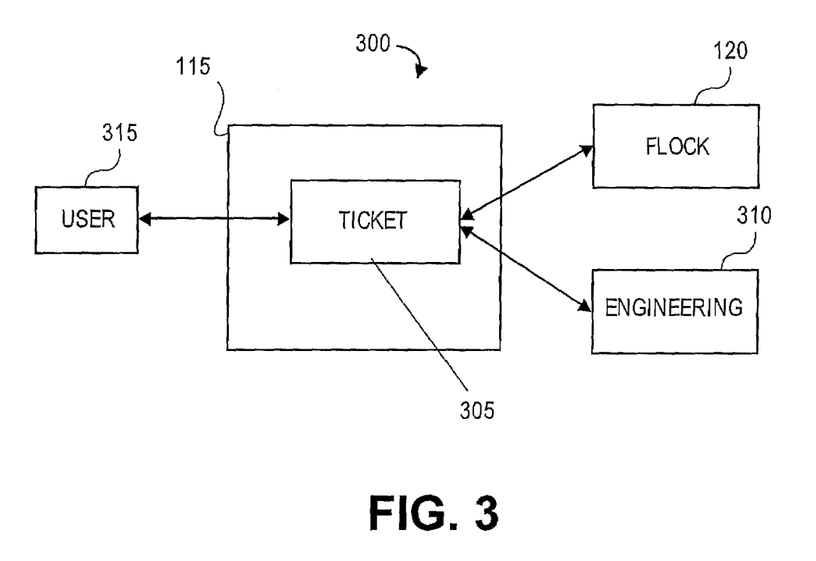
FIG. 3 depicts an exemplary distribution structure for a ticket in accordance with yet another embodiment.

FIG. 3 illustrates a diagram 300 of a user association with a ticket in a flock in accordance with yet another embodiment. As shown in FIG. 3, a support ticket 305 can be associated with a specific flock 120 as managed by the flock module 135. As part of the distribution list, the flock module 135 can also automatically include the reporting user 315 as well as any interested members of an engineering team 310 for the status updates, comments, posts, etc, of the support ticket 305. Accordingly, the reporting user 310 can have visibility in the resolution process of the reported technical issue by the specific flock 120.

Figure 4:
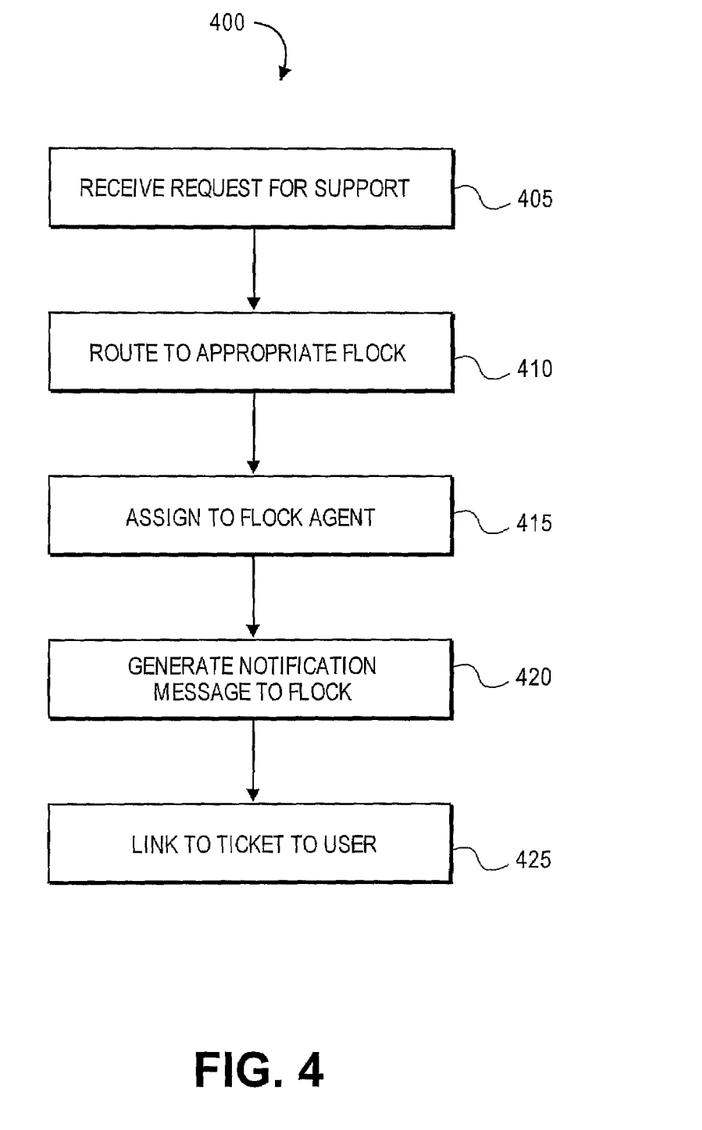
FIG. 4 illustrates an exemplary flow diagram for routing in accordance with yet another embodiment.

FIG. 4 depicts an exemplary flow diagram 400 for routing from a web request in accordance with yet another embodiment. It should be readily apparent to those of ordinary skill in the art that the flow diagram 400 depicted in FIG. 4 represents a generalized schematic illustration and that other steps may be added or existing steps may be removed or modified.

As shown in FIG. 4, the flock module 135 can be configured to receive a a web request for assistance from a web service and/or website, in step 405. More particularly, a user can log-in to a web-site that provides technical support. After authentication and verification of entitlements to the technical support, a user can be directed to a graphical user interface such as a web page that is configured to query the user for the product and/or service and a description of the technical issue or problem. An example of this type of web page is shown in FIG. 5.

Figure 5:
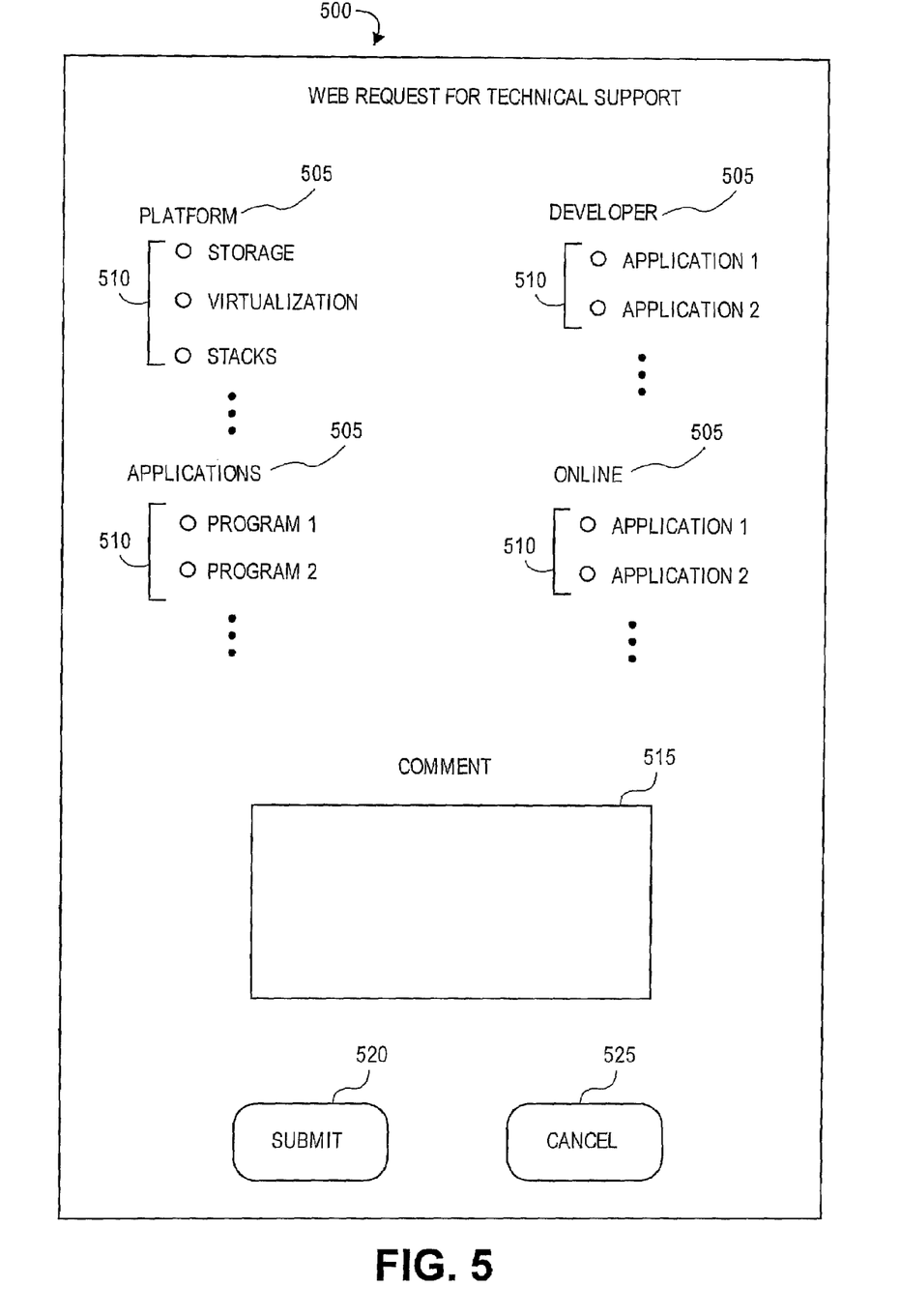
FIG. 5 depicts an exemplary graphical user interface for a technical support request in accordance with yet another embodiment.

FIG. 5 depicts an exemplary technical support request GUI 500 in accordance with yet another embodiment. The technical support request GUI 500 (hereinafter "GUI 500") is merely illustrative and other variations of the GUI 500 are well within the contemplated embodiments. The GUI 500 can be implemented as a graphical page implemented in XML, HTML, SGML, or other similar mark-up language.

As shown in, FIG. 5, the GUI 500 can comprise of product/service headings 505 which define the types of supported products/services. Under each product/service headings 505 are the respective supported products/services 510 with an associated selector buttons 510. A user can specify a particular product/service that the user would like to request assistance.

The GUI 500 can also comprise a comment box 515 that allows a user to describe in greater detail the problem with the selected product/service. The comment box 515 can be implemented as text box entry as known to those skilled in the art.

The GUI 500 can further comprise a submit button 520 and a cancel button 525. The submit button 520 can be configured to package the selection of the product/service along with the entered comment to the flock module 135 when activated. The cancel button 525 can be configured to return the user to the calling web page and discard any data when activated.

Returning to FIG. 4, in step 410, the flock module 135 can be configured to route the received web request to the appropriate flock 120 when the user activate the submit button 520 of the GUI 500.

In step 415, the flock module 135 can be configured to assign the web request to the first available technical support engineer. In other embodiments, the flock module 135 can assign any received web request based on a user-defined algorithm or heuristic such as first available junior member. The flock module 135 can also invoke that a support ticket be created in the case management system 115.

In step 420, the flock module 135 can be configure to generate a notification message to all the members junior and senior) of the flock 120. More particularly, the notification message can comprise of information such as the support ticket reference number or identification, a description of the problem, the assigned member, and a request for the members to contribute any solutions to the problem. The notification message can also be sent to any interested third parties.

The flock module 135 can also be configure to create a subscription link for the interested third parties to participate in the resolution process of the support ticket. Accordingly, interest third parties can activate the subscription link to join the resolution process.

In step 425, the flock module 135 can provide the subscription link to the user. The user can then be informed of the progress of the reported problem as it is resolved by the flock 120, i.e, visibility, when the subscription link is activated.

Figure 6:
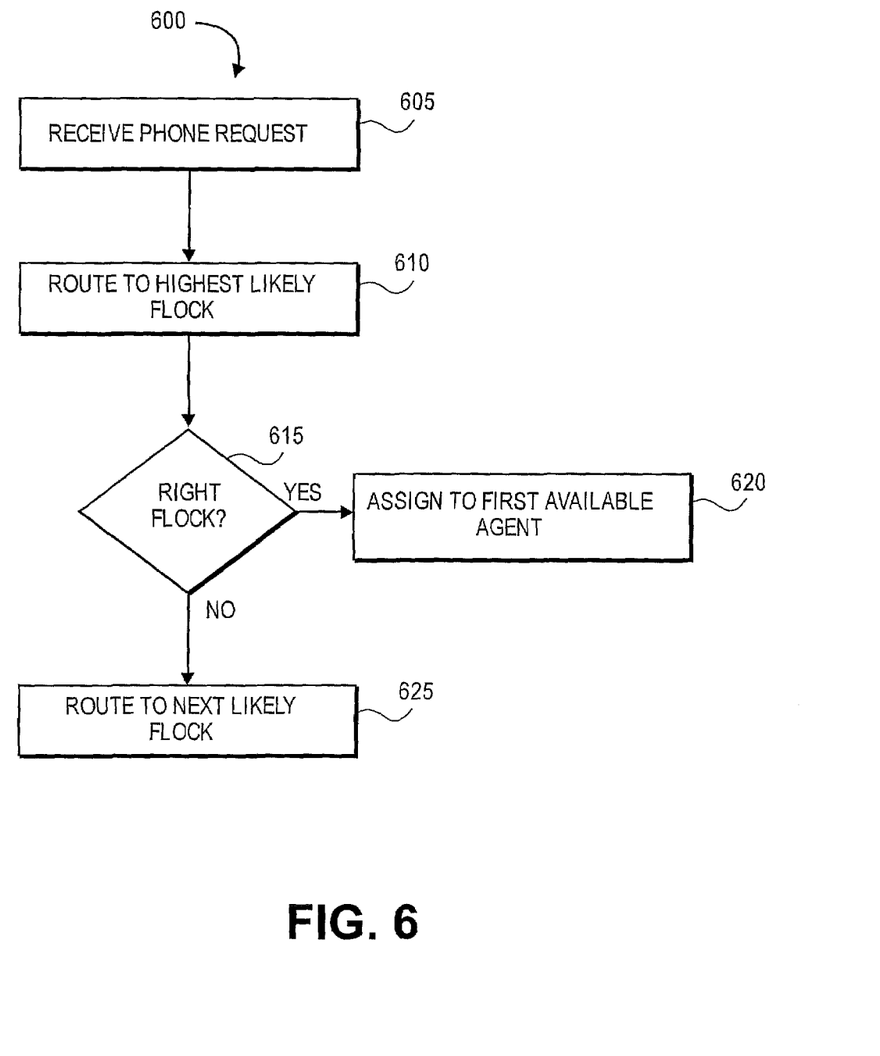
FIG. 6 illustrates an exemplary flow diagram for telephone routing in accordance with yet another embodiment.

FIG. 6 illustrates an exemplary flow diagram 600 executed by the telephone router module 125 in accordance with yet another embodiment. It should be readily apparent to those of ordinary skill in the art that the flow diagram 600 depicted in FIG. 6 represents a generalized schematic illustration and that other steps may be added or existing steps may be removed or modified.

As shown in FIG. 6, the telephone router module 125 can be configured to receive a telephone call from an existing telephone network, in step 605. The telephone router module 125 can then route the received telephone call to the highest likely flock 120 as previously described, in step 610.

In step 615, a first available service agent can answer the telephone call and determine whether the telephone call was directed to the right flock. In other embodiments, a user-defined algorithm/heuristic can be used to determine which member of the flock answers the telephone call.

If the telephone call was correctly routed, in step 615, the answering service agent is then assigned the technical issue associated with the telephone call, in step 620. The service agent can open a support ticket in the case management system 115. The flock module 135 can then forward the notification message to the rest of the flock as previously described with respect to FIG. 4. Otherwise, if the call was incorrectly routed to the flock, in step 615, the service agent can route the telephone call to the correct flock, in step 625.

Figure 7:
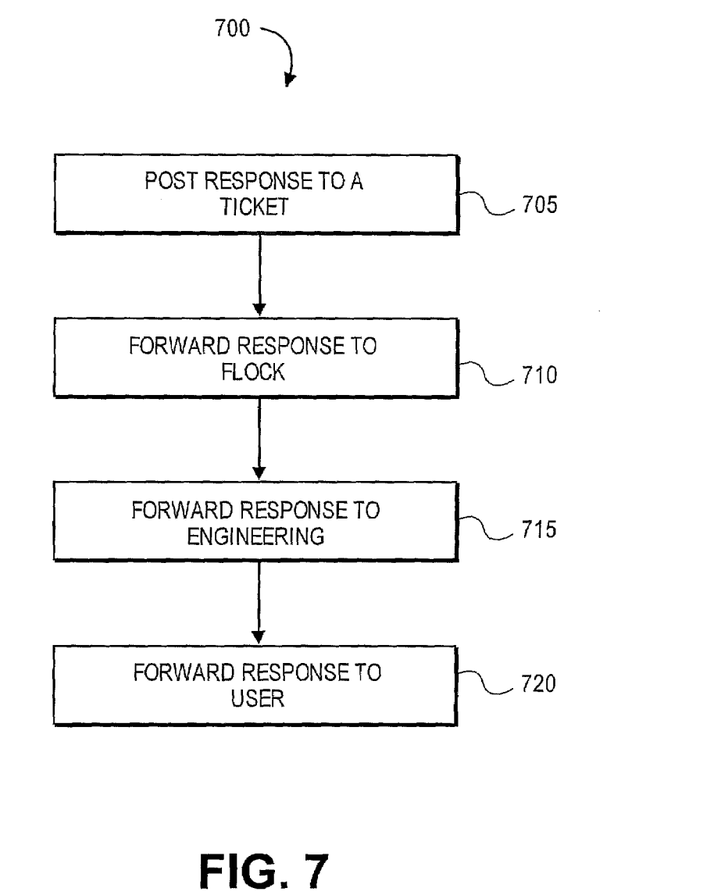
FIG. 7 depicts an exemplary flow diagram for distributing posts in accordance with yet another embodiment.

FIG. 7 illustrates an exemplary flow diagram 700 executed by the flock module 135 in accordance with yet another embodiment. It should be readily apparent to those of ordinary skill in the art that the flow diagram 700 depicted in FIG. 7 represents a generalized schematic illustration and that other steps may be added or existing steps may be removed or modified.

As shown in FIG. 7, the flock module 135 can be configured to receive a response for a support ticket, in step 705. The response can be a status update, a comment, a potential resolution post, etc. as provided by a member of the flock 120.

In step 710, the flock module 135 can then forward received response to the entire flock 120 to keep the members of the flock informed of the status of the support ticket. Similarly, in step 715, the flock module 135 can forward the received response to any interested third parties. Finally, in step 720, the flock module can forward the received response to the reporting user.

Figure 8:
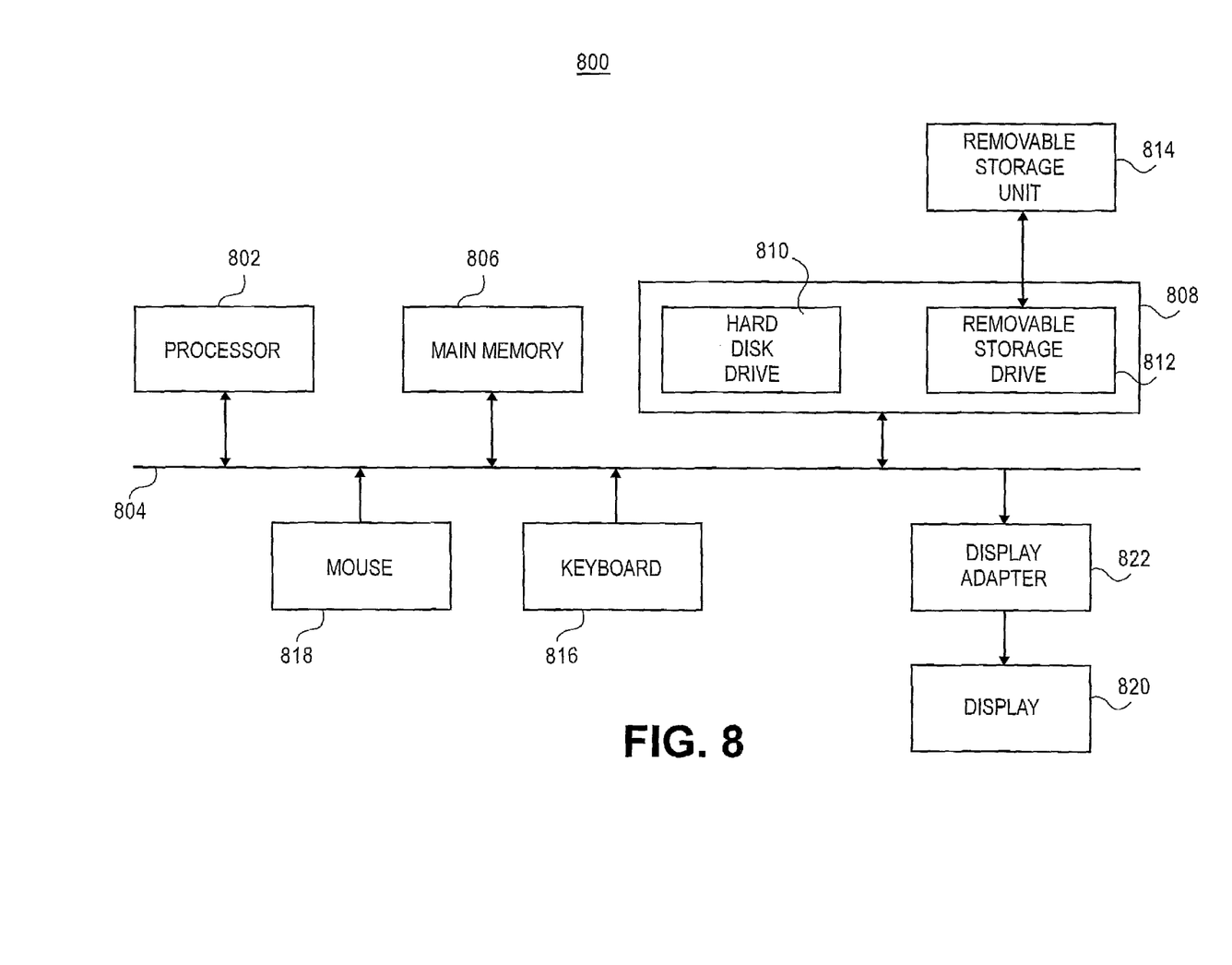
FIG. 8 depicts an exemplary computing platform in accordance with yet another embodiment.

FIG. 8 illustrates an exemplary block diagram of a computing platform 800 where an embodiment may be practiced. The functions of the flock module may be implemented in program code and executed by the computing platform 800. The flock module may be implemented in computer languages such as PASCAL, C, C++, JAVA, etc.

As shown in FIG. 8, the computer system 800 includes one or more processors, such as processor 802 that provide an execution platform for embodiments of the flock module 135. Commands and data from the processor 802 are communicated over a communication bus 804. The computer system 800 also includes a main memory 806, such as a Random Access Memory (RAM), where the flock module 130 may be executed during runtime, and a secondary memory 808. The secondary memory 808 includes, for example, a hard disk drive 810 and/or a removable storage drive 812, representing a floppy diskette drive, a magnetic tape drive, a compact disk drive, etc., where a copy of a computer program embodiment for the flock module 135 may be stored. The removable storage drive 812 reads from and/or writes to a removable storage unit 814 in a well-known manner. A user interfaces with the flock module 135 with a keyboard 816, a mouse 818, and a display 820. The display adapter 822 interfaces with the communication bus 804 and the display 820. The display adapter 822 also receives display data from the processor 802 and converts the display data into display commands for the display 820.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
receiving, by a processor, a technical issue;
selecting, by the processor, a technical group from a plurality of technical groups according to a technical area of the technical issue and amount of technical assistance requests handled by the selected technical group;
routing, by the processor, the technical issue to the selected technical group;
instantiating, by the processor, a ticket for the technical issue;
generating, by the processor, a subscription link associated with the ticket to a plurality of members outside of the selected technical group;
receiving, by the processor, a post from a member among the plurality of members outside of the selected technical group upon activation of the subscription link from the member, wherein the post comprise a resolution of the technical issue; and
providing a status of the ticket to the plurality of members outside the selected technical group, in view of the post upon activation of the subscription link from the plurality of members.

2. The method of claim 1, further comprising assigning the technical issue to a member of the selected technical group.

3. The method of claim 2, further comprising broadcasting a notification message to the selected technical group, wherein the notification message comprises one of an identification of the ticket, description of the technical issue, the assigned member of the selected technical group, or a request to contribute any solutions to the technical issue.

4. The method of claim 3, further comprising providing a comment associated with the technical issue from the member of the selected technical group.

5. The method of claim 1 further comprising broadcasting the post to the selected technical group.

6. The method of claim 1 further comprising generating a solution to the technical issue from the selected technical group.

7. The method of claim 1, further comprising providing the resolution of the technical issue to the selected technical group.

8. The method of claim 1, further comprising providing the status of the ticket to the selected technical group.

9. A system comprising:
a processor;
a system memory coupled to the processor to provide instructions to the processor, and in response to the instructions, the processor to:
receive a technical issue;
select a technical group from a plurality of technical groups according to a technical area of the technical issue and amount of technical assistance requests handled by the selected technical group;
route the technical issue to the selected technical group;
instantiate a ticket for the technical issue;
generate a subscription link associated with the ticket to a plurality of members outside of the selected technical group;
receive a post from a member among the plurality of members outside of the selected technical group upon activation of the subscription link from the member, wherein the post comprise a resolution of the technical issue; and
provide a status of the ticket to the plurality of members outside the selected technical group, in view of the post upon activation of the subscription link from the plurality of members.

10. The system of claim 9, the processor to assign the technical issue to a member of the selected technical group.

11. The system of claim 10, the processor to broadcast a notification message to the selected technical group, wherein the notification message comprises one of an identification of the ticket, description of the technical issue, the assigned member of the selected technical group, or a request to contribute any solutions to the technical issue.

12. The system of claim 11, the processor to provide a comment associated with the technical issue from the member of the selected technical group.

13. The system of claim 9, the processor to broadcast the post to the selected technical group.

14. The system of claim 9, the processor to generate a solution to the technical issue from the selected technical group.

15. The system of claim 9, the processor to provide the resolution of the technical issue to the selected technical group.

16. The system of claim 9, the processor to provide the status of the ticket to the selected technical group when the subscription link is activated.

17. A non-transitory computer readable medium including instructions that, when executed by a processor, cause the processor to perform an operation comprising:
receiving, by a processor, a technical issue;
selecting, by the processor, a technical group from a plurality of technical groups according to a technical area of the technical issue and amount of technical assistance requests handled by the selected technical group;
routing, by the processor, the technical issue to the selected technical group;
instantiating, by the processor, a ticket for the technical issue;
generating, by the processor, a subscription link associated with the ticket to a plurality of members outside of the selected technical group;
receiving, by the processor, a post from a member among the plurality of members outside of the selected technical group upon activation of the subscription link from the member, wherein the post comprise a resolution of the technical issue; and
providing a status of the ticket to the plurality of members outside the selected technical group, in view of the post upon activation of the subscription link from the plurality of members.

18. The non-transitory computer readable medium of claim 17, wherein the operation further comprises assigning the technical issue to a member of the selected technical group.

19. The non-transitory computer readable medium of claim 17, wherein the operation further comprises broadcasting a notification message to the selected technical group, wherein the notification message comprises one of an identification of the ticket, description of the technical issue, the assigned member of the selected technical group, or a request to contribute any solutions to the technical issue.

20. The non-transitory computer readable medium of claim 17, wherein the operation further comprises providing a comment associated with the technical issue from the member of the selected technical group.

21. The non-transitory computer readable medium of claim 17, wherein the operation further comprises providing the resolution of the technical issue to the selected technical group.

22. The non-transitory computer readable medium of claim 17, wherein the operation further comprises providing the status of the ticket to the selected technical group.

23. The non-transitory computer readable medium of claim 17, wherein the operation further comprises broadcasting the post to the selected technical group.

24. The non-transitory computer readable medium of claim 17, wherein the operation further comprises generating a solution to the technical issue from the selected technical group.

* * * * *